(12) United States Patent
Gerez et al.

(10) Patent No.: US 8,474,307 B2
(45) Date of Patent: Jul. 2, 2013

(54) METHOD FOR DETECTING RESONANCE IN A ROTOR SHAFT OF A TURBINE ENGINE

(75) Inventors: Valerio Gerez, Yerres (FR); Julien Christian Pascal Griffaton, Paris (FR)

(73) Assignee: Snecma, Paris (FR)

( * ) Notice: Subject to any disclaimer, the term of this patent is extended or adjusted under 35 U.S.C. 154(b) by 274 days.

(21) Appl. No.: 13/030,672

(22) Filed: Feb. 18, 2011

(65) Prior Publication Data
US 2011/0259093 A1   Oct. 27, 2011

(30) Foreign Application Priority Data
Feb. 18, 2010   (FR) ..................................... 10 51193

(51) Int. Cl.
*G01M 15/14* (2006.01)
(52) U.S. Cl.
USPC ..................................................... 73/112.01
(58) Field of Classification Search
USPC ................ 73/112.01, 112.03, 112.04, 112.05
See application file for complete search history.

(56) References Cited

U.S. PATENT DOCUMENTS

| 6,986,641 | B1 | 1/2006 | Desai et al. | |
|---|---|---|---|---|
| 8,350,742 | B2 * | 1/2013 | Gerez et al. | 341/155 |
| 2003/0056518 | A1 | 3/2003 | Woltmann | |
| 2003/0094001 | A1 | 5/2003 | Desai et al. | |
| 2004/0154300 | A1 | 8/2004 | Woltmann | |
| 2005/0166573 | A1 | 8/2005 | Hommema | |
| 2007/0245746 | A1 | 10/2007 | Mollmann et al. | |
| 2009/0204306 | A1 | 8/2009 | Goeke et al. | |
| 2011/0199249 | A1 * | 8/2011 | Gerez et al. | 341/155 |
| 2012/0229290 | A1 * | 9/2012 | Gerez et al. | 340/669 |
| 2012/0272736 | A1 * | 11/2012 | Griffaton | 73/593 |

FOREIGN PATENT DOCUMENTS

| EP | 1 298 053 A2 | 4/2003 |
|---|---|---|
| JP | 2003-293794 | 10/2003 |
| WO | WO 2006/045181 A1 | 5/2006 |

OTHER PUBLICATIONS

French Preliminary Search Report issued Jan. 3, 2011, in French 10 51193, filed Feb. 18, 2010 (with English Translation of Category of Cited Documents).

* cited by examiner

*Primary Examiner* — Eric S McCall
(74) *Attorney, Agent, or Firm* — Oblon, Spivak, McClelland, Maier & Neustadt, L.L.P.

(57) ABSTRACT

A method for detecting resonance in a rotor shaft of a turbine engine, in which a resonance frequency (Fr) of the rotor shaft belonging to a resonance band is centered on an estimated resonance frequency ($Fr_{est}$), is disclosed. The method including: measuring a parameter (P) for regulating the fuel of the turbine engine is measured to obtain an excitation signal; forming a spectrum of the excitation signal; comparing an amplitude of the excitation signal is compared with a resonance threshold (S) on the resonance band of the spectrum; and emitting a resonance detection alarm if the resonance threshold (S) is exceeded.

3 Claims, 3 Drawing Sheets

METHOD FOR DETECTING RESONANCE IN A ROTOR SHAFT OF A TURBINE ENGINE

BACKGROUND OF THE INVENTION

1. Field of the Invention

The invention relates to the field of aviation and, more particularly, the protection of a rotor shaft of a turbine engine against vibratory phenomena.

2. Description of the Related Art

A turbine engine mounted on an aircraft comprises one or more rotary shafts which provide the aircraft with thrust. Conventionally, a rotary shaft has a specific pulsation which corresponds to its first torsional mode. This torsional mode is characteristic of the geometry of the rotor shaft. In other words, the pulsation of the rotor shaft corresponds to an intrinsic vibratory frequency of the rotor shaft. Rotor shafts of one and the same type of turbine engine each have a specific pulsation, of the same order of magnitude, of between 20 and 50 Hz.

When the pulsation of the rotor shaft is excited, for example, when it receives a vibratory signal of which the frequency corresponds to its pulsation, the latter begins to resonate which leads to the generation of noises in the aircraft cabin and fatigue of the shaft.

This results in several drawbacks. First of all, the pilot of the aircraft, alerted by the noise, may ask for the turbine engine to be fully checked over, the aircraft then being immobilized on the ground which is a drawback. Moreover, the fatigue of the rotor shaft accelerates the wear of the mechanical elements surrounding the shaft, the elements therefore having to be replaced early, which increases maintenance costs.

In order to detect the inception of a resonance of the rotor shaft, several detection systems are known that make it possible to measure the vibratory response of the shaft due to an excitation, for example, by means of a tachymeter or of accelerometers as divulged in patent application FR2892516 by SNECMA. By virtue of such detection systems, which are preferably on board, it is possible to detect a resonance of the shaft.

Such detection systems are reliable but detection errors still remain. In order to improve the current detection systems, an immediate solution would consist in coupling a detection system comprising tachymeters with a detection system comprising accelerometers. Since these two systems measure the same type of signal (the vibratory response of the rotor shaft), such a coupling provides only a slight gain in reliability.

BRIEF SUMMARY OF THE INVENTION

In order to resolve some of these drawbacks, the invention relates to a method for detecting resonance in a rotor shaft of a turbine engine, the resonance frequency of the said rotor shaft belonging to a resonance band centred on an estimated resonance frequency, a method in which:
- a parameter for regulating the fuel of the turbine engine is measured to obtain an excitation signal;
- a spectrum of the excitation signal is formed;
- the amplitude of the excitation signal is compared with a resonance threshold on the resonance band of the said spectrum; and
- a resonance detection alarm is emitted if the resonance threshold is exceeded.

By virtue of the invention, the source of the resonance is measured directly in the excitation signal and not the vibratory response of the rotor shaft. Therefore, it is possible to detect a resonance early and reliably.

The applicant has noticed that a variation of a fuel parameter, such as the fuel pressure or flow rate, induces an excitation signal which excites the rotor shaft. Specifically, the fuel is injected in a pulsed manner which generates a variation in the regulation parameters over time at a rapid frequency.

When the vibration frequency of the excitation signal corresponds to the pulsation of the rotor shaft, the latter begins to resonate. This vibration frequency of the excitation signal is hereinafter called "resonance frequency". Comparing the amplitude of the excitation signal with a threshold makes it possible to detect a resonance of the rotor shaft and to qualify it (noise, fatigue, etc.).

Such a detection method considerably increases the reliability of a resonance-detection system because this method is independent of the vibration measurements taken on the vibratory response of the rotor shaft with the aid of tachymeters or accelerometers as in the prior art.

While all the documents of the prior art teach of improving the measurement of resonance in the vibratory response of the rotor shaft, the applicant takes the opposite view to these approaches and measures the source of resonance in the excitation signal of the pulsation of the rotor shaft. In other words, the "fuel pulsation" is measured.

This approach is all the more inventive because it is based on an excitation signal which is, at first sight, inappropriate for running signal-processing algorithms.

Specifically, today's turbine engines conventionally comprise a computer arranged to measure and save parameters of the engine and of its equipment. This computer, known to those skilled in the art as the ACMS for "Aircraft Condition Monitoring System" measures the fuel-regulation parameters (fuel flow rate, fuel pressure, etc.) and other "slow" parameters, that is to say parameters of which the frequency of variation is below 5 Hz such as temperature for example. This measurement is taken by sampling an analogue signal obtained by a sensor of the turbine engine, in a digital signal at a low sampling frequency, around 30 Hz.

The fuel-regulation parameters are slow parameters in that they generally vary at a frequency below 5 Hz.

For a computer, its sampling frequency is associated with a Shannon frequency corresponding to half its sampling frequency. For any signal-processing specialist, it is known that it is not possible to correctly sample an analogue signal comprising a frequency higher than the Shannon frequency of the computer because that would induce an aliasing of the sampled signal and therefore a deformation of the measurement.

Therefore, a computer of a sampling frequency equal to 30 Hz has a Shannon frequency equal to 15 Hz and is completely suitable for measuring slow signals (below 5 Hz) but unsuitable for measuring local variations of the signal of which the frequency is higher than its Shannon frequency such as the resonance frequency of a fuel parameter.

Moreover, such a computer is intrinsically unsuitable for the algorithms of signal processing because it does not comprise a low-pass filter arranged to remove, from the analogue signal to be sampled, the frequencies higher than the Shannon frequency in order to prevent any aliasing.

In other words, this computer is not designed to measure "rapid" frequencies and those skilled in the art have no interest in such computers for resolving resonance phenomena. Those skilled in the art are not encouraged to search for pertinent information in an excitation signal comprising aliasing, such an excitation signal being considered an unclean signal.

Advantageously, the parameter for regulating the fuel of the turbine engine being sampled by a digital computer at a determined Shannon frequency and at a determined sampling frequency, the estimated resonance frequency being greater than the Shannon frequency, the method comprises a step, in which the amplitude of the excitation signal is compared with the resonance threshold over an aliased band corresponding to the resonance band translated so that the aliased band is centred on an estimated aliased frequency equal to the sampling frequency minus the estimated resonance frequency.

By diverting the computer from its usual use and by taking advantage of the aliasing of the frequencies higher than the Shannon frequency of the computer, the amplitude of the resonance frequency is measured in the aliasing of the excitation signal. This gives a more reliable and more effective system for detecting resonance.

An immediate solution for measuring the resonance frequency in the excitation signal would have been to increase the sampling frequency of the computer so that its Shannon frequency is higher than the resonance frequency and thus prevent the aliasing of the signal. Unfortunately, such a solution would make it necessary to modify all the computers of current aircraft which would be very costly.

By virtue of the invention, the reliability of the detection systems with the existing computers is increased. Moreover, no additional sensor is added.

The coupling of a method according to the invention with a method according to the prior art makes it possible to significantly increase the reliability of detection because the methods monitor first the excitation signal and secondly the vibratory response of the rotor shaft.

The invention also relates to a computer program for the execution of the method as outlined above and a saving medium in which the program is stored.

BRIEF DESCRIPTION OF THE SEVERAL VIEWS OF THE DRAWINGS

The invention will be better understood with the aid of the appended drawing in which.

DETAILED DESCRIPTION OF THE INVENTION

According to the invention, a turbine engine mounted on an aircraft comprises a system for detecting resonance of a rotor shaft. The rotor shaft has a specific pulsation which corresponds to its first torsional mode. The pulsation depends on the geometry of the rotor shaft and is known.

The resonance phenomenon, hereinafter called resonance, occurs during an excitation of the rotor shaft by an excitation signal, the frequency of which corresponds to the pulsation of the shaft, this frequency of the excitation signal being called the resonance frequency Fr. In other words, if the rotor shaft is excited by a signal at the resonance frequency Fr, the rotor shaft begins to resonate which generates a noise and a fatigue of the rotor shaft.

Knowing the pulsation of the rotor shaft, the resonance frequency of the excitation signal called the "estimated" resonance frequency $Fr_{est}$ is estimated. Since the "real" resonance frequency Fr belongs to the frequency band centred on the estimated resonance frequency $Fr_{est}$, this frequency band is hereinafter called the "resonance band". The resonance band comprises a lower limit $Fr_{inf}$ and an upper limit $Fr_{sup}$, while the resonance band is centred on the estimated resonance frequency $Fr_{est}$.

In this example, the estimated resonance frequency $Fr_{est}$ is 35 Hz, the resonance band being defined between 25 Hz and 45 Hz.

The detection system comprises a computer arranged to sample an analogue signal of a parameter P for regulating the fuel of the turbine engine measured by a sensor of the turbine engine. Since the fuel is injected in a pulsed manner, it is capable of generating vibrations and of exciting the rotor shaft. In order to detect a resonance, an attempt is made to measure the pulsation of the fuel by measuring a resonance frequency Fr in the fuel parameter P.

Conventionally, the computer has a sampling frequency Fe and a Shannon frequency Fs defined as half the sampling frequency Fs.

The fuel parameter is in this instance a fuel flow rate but it could be an opening of a fuel supply valve, a fuel pressure, etc.

In this instance, the computer comprises an analogue/digital converter for sampling and a memory for saving the sampled signal like a black box. In this example, the computer conventionally takes the form of an ACMS as explained above.

Figure 1:
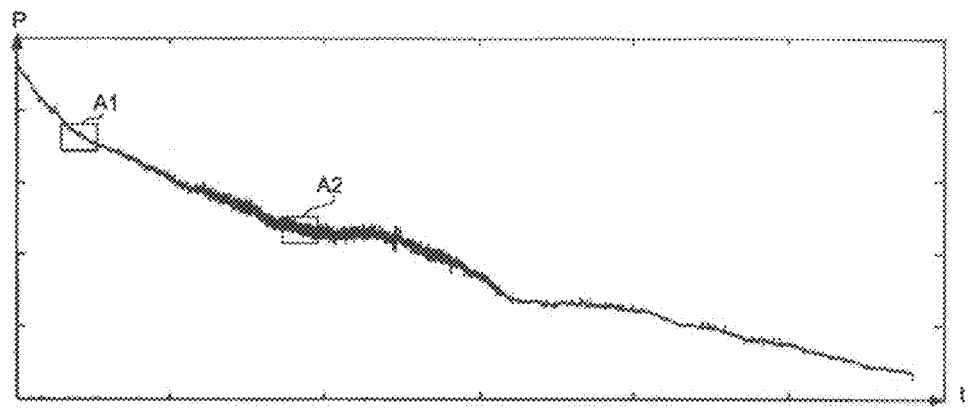
FIG. 1 is a curve representing a measurement of a fuel-regulation parameter during a flight phase of an aircraft.
Figure 2:
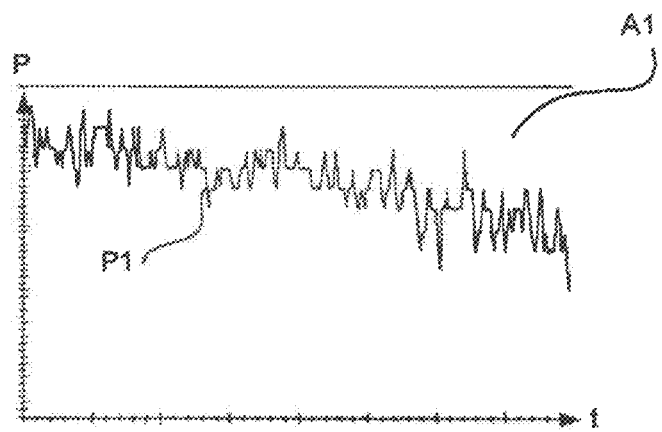
FIG. 2 is a close-up view on a first time window A1 of the curve of FIG. 1 containing only slow frequencies.

With reference to FIG. 1, the analogue signal, measured by a sensor of the turbine engine during a flight of an aircraft, varies generally at a slow frequency, less than 5 Hz, but locally, on time windows, has rapid frequency variations, higher than 5 Hz.

Figure 3:
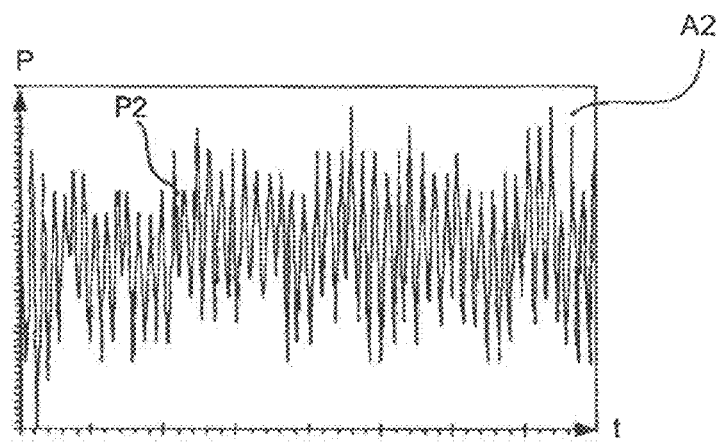
FIG. 3 is a close-up view on a second time window A2 of the curve of FIG. 1 containing only rapid frequencies.

In FIG. 1, the analogue signal, on a first time window A1, has a low frequency, lower than 5 Hz, and, on a second time window A2, a rapid frequency, higher than 5 Hz, as shown in FIG. 3. Hereinafter, the signals of the time windows A1, A2 are respectively referenced P1, P2.

According to a first embodiment of the invention, the Shannon frequency Fs of the computer is higher than the resonance frequency Fr. Therefore, the signal sampled by the computer comprises no aliasing of the resonance frequency Fr.

As an example, the computer according to the first embodiment has a sampling frequency Fe1 equal to 100 Hz and, consequently, a Shannon frequency Fs1 equal to 50 Hz. The resonance band [25 Hz-45 Hz], defined above, is therefore lower than the Shannon frequency Fs of the said computer.

Figure 4:
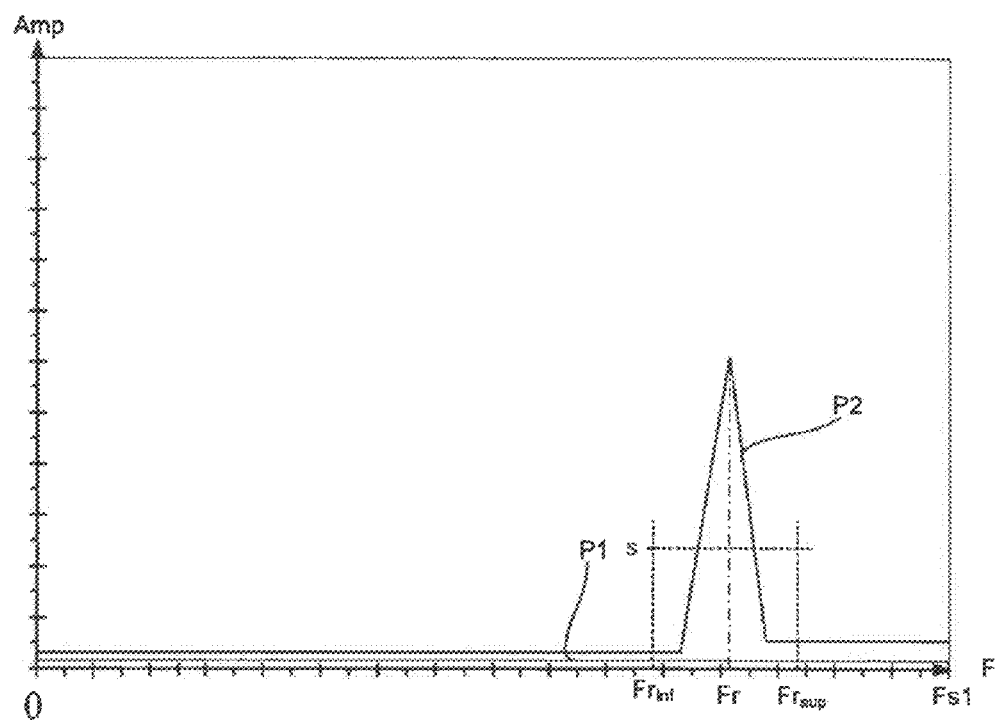
FIG. 4 is a first schematic spectral representation of the time windows A1, A2 of the curve of FIG. 1 with a computer, the Shannon frequency of which is higher than the estimated resonance frequency.

At the sampling frequency Fe1 of 100 Hz, the analogue signals P1, P2 measured by a fuel flow rate sensor are sampled by means of the computer. Then, a spectrum of the said signals P1, P2 is formed as shown in FIG. 4. In this example, the spectrum is formed by a Fast Fourier Transform. The amplitude of the spectrum is compared with a resonance threshold S on the resonance band [25 Hz-45 Hz], the resonance threshold S being predetermined in this instance.

FIG. 4 shows that the amplitude of the spectrum of the signal P2 has a local maximum in the resonance band at the frequency 33 Hz which in this instance corresponds to the "real" resonance frequency Fr.

Since the amplitude of the spectrum at the resonance frequency Fr is higher than the value of the resonance threshold S, a resonance detection alarm is emitted. Preferably, this alarm is emitted to the attention of the pilot of the aircraft on which the turbine engine is mounted. As an example, the alarm takes the form of a message "fuel pulsations present and risk of rotor damage".

According to a second embodiment of the invention, the Shannon frequency Fs of the computer is lower than the resonance frequency Fr. Therefore, the signal sampled by the computer comprises an aliasing of the resonance frequency Fr.

In practice, the computer according to the second embodiment corresponds to the majority of current computers mounted on turbine engines.

As an example, the computer according to the second embodiment has a sampling frequency Fe2 equal to 50 Hz and, consequently, a Shannon frequency Fs2 equal to 25 Hz. Because of the aliasing, the resonance frequency Fr is not visible but is aliased at an aliasing frequency Fre. In order to determine conventionally an aliased frequency of a predetermined frequency, it is estimated that the aliased frequency is equal to the sampling frequency minus the estimated resonance frequency $Fr_{est}$.

Therefore, the aliased frequency $Fre_{est}$ is equal to the sampling frequency $F_{e1}$ minus the estimated resonance frequency $Fr_{est}$. In this example, the estimated aliased frequency $Fre_{est}$ is equal to 15 Hz (50 Hz-35 Hz).

In order to detect the resonance, the resonance band [25 Hz-45 Hz], defined above, is not suitable because it does not take account of the aliasing.

Accordingly, an aliased band is defined corresponding to the resonance band translated by the Shannon frequency of the computer so that the aliased band is centred on the estimated aliased frequency $Fre_{est}$. In other words, aliasing is applied to the resonance band.

In this example, the resonance band [25 Hz-45 Hz] centred on the estimated resonance frequency $Fr_{est}$, equal to 35 Hz, is transformed into the aliased band [5 Hz-25 Hz] centred on the estimated aliased frequency $Fre_{est}$, equal to 15 Hz.

This gives the following mathematical relations:

$$Fre = Fe - Fr \quad\quad 1)$$

$$Fre_{inf} = Fe - Fr_{sup} \quad\quad 2)$$

$$Fre_{sup} = Fe - Fr_{inf} \quad\quad 3)$$

By means of the computer, the analogue signals P1, P2 measured by a fuel flow sensor are sampled at the sampling frequency Fe2 of 50 Hz. Then, a spectrum of the said signals P1, P2 is formed as shown in FIG. 5.

The amplitude of the spectrum is compared with a predetermined resonance threshold S on the aliased band [5 Hz-25 Hz].

Figure 5:
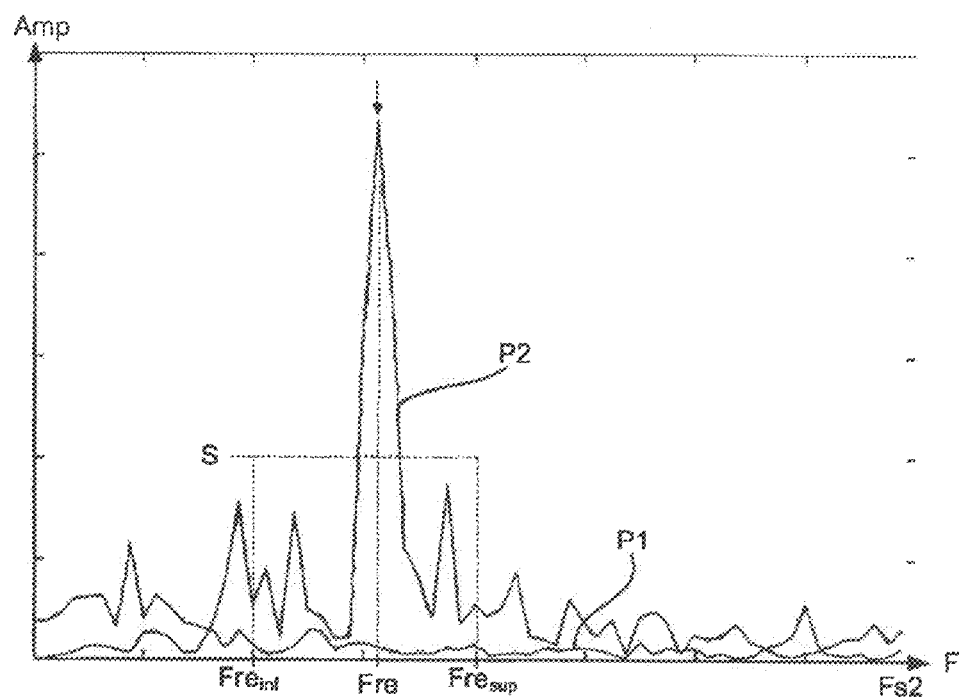
FIG. 5 is a second spectral representation of the time windows A1, A2 of the curve of FIG. 1 with a computer, the Shannon frequency of which is lower than the estimated resonance frequency.

Still with reference to FIG. 5, it is noted that the amplitude of the spectrum of the signal P2 has a local maximum in the aliased band at the frequency 13 Hz which in this instance corresponds to the "real" aliased frequency Fre.

Since the amplitude of the spectrum at the aliased frequency Fre is higher than the value of the resonance threshold S, a resonance detection alarm is emitted. Preferably, this alarm is emitted to the attention of the pilot of the aircraft on which the turbine engine is mounted. As an example, the alarm takes the form of a message "fuel pulsations present".

It will be noted that, in this second embodiment, the computer must not have an "anti-aliasing" low-pass filter at the Shannon frequency of the computer since the resonance frequency that is sought is included in the aliasing of the signal.

Only one resonance threshold has been shown, but it goes without saying that the method could include several resonance thresholds in order to qualify the severity of the resonance (noise in the cabin, fatigue, etc.).

Alternatively, a preprocessing of the analogue signal is carried out in order to remove its continuous component. As an example, the latter is removed by applying a high-pass filter to the analogue signal.

A computer has been shown for computing the sampling frequency Fe equal to 50 Hz, but it goes without saying that a different sampling frequency, equal to 30 or 40 Hz for example, would also be suitable.

Preferably, the detection method according to the invention also comprises steps for detecting a resonance in the vibratory response of the rotor shaft as shown in application FR2892516. The method also comprises a step in which the results of the detection of resonance in the excitation signal and of the detection of resonance in the vibratory response of the rotor shaft are merged. By virtue of these detection steps of different kinds, a precise and reliable diagnosis of the vibratory phenomena sustained by the rotor shaft is achieved.

According to a preferred form of the invention, the steps of the method are applied in an on-board computer so as to provide a diagnosis in real time. The application of the method is simple because it requires only a software update of the ACMSs installed in the existing turbine engines.

It goes without saying that the method may also be applied on a test bench, in a "Health monitoring" monitoring box on board or on the ground and in a computer card.

The invention claimed is:

1. A method for detecting resonance in a rotor shaft of a turbine engine, a resonance frequency (Fr) of the rotor shaft belonging to a resonance band centered on an estimated resonance frequency ($Fr_{est}$), the method comprising:
   measuring a parameter (P) for regulating fuel of the turbine engine to obtain an excitation signal;
   forming a spectrum of the excitation signal;
   comparing an amplitude of the excitation signal with a resonance threshold (S) on the resonance band of the spectrum; and
   emitting a resonance detection alarm if the resonance threshold (S) is exceeded.

2. The method according to claim 1, wherein the parameter for regulating the fuel of the turbine engine is sampled by a digital computer at a determined Shannon frequency (Fs) and at a determined sampling frequency (Fe), the estimated resonance frequency ($Fr_{est}$) being greater than the Shannon frequency (Fs), the method further comprising:
   comparing the amplitude of the excitation signal with the resonance threshold (S) over an aliased band corresponding to the resonance band translated so that the aliased band is centered on an estimated aliased frequency ($Fre_{est}$) equal to the sampling frequency (Fe) minus the estimated resonance frequency ($Fr_{est}$).

3. A computer-readable, non-transitory storage medium storing a program for detecting resonance in a rotor shaft of a turbine engine, in which a resonance frequency (Fr) of the rotor shaft belonging to a resonance band centered on an estimated resonance frequency ($Fr_{est}$), wherein the program, when executed, cause a computer to perform a method comprising:
   measuring a parameter (P) for regulating fuel of the turbine engine to obtain an excitation signal;
   forming a spectrum of the excitation signal;
   comparing an amplitude of the excitation signal with a resonance threshold (S) on the resonance band of the spectrum; and emitting a resonance detection alarm if the resonance threshold (S) is exceeded.

* * * * *

UNITED STATES PATENT AND TRADEMARK OFFICE
CERTIFICATE OF CORRECTION

PATENT NO. : 8,474,307 B2
APPLICATION NO. : 13/030672
DATED : July 2, 2013
INVENTOR(S) : Valerio Gerez et al.

It is certified that error appears in the above-identified patent and that said Letters Patent is hereby corrected as shown below:

In the Specification:

Column 5, line 23, change "$F_{c1}$" to --$F_{e1}$--.

Signed and Sealed this
Tenth Day of September, 2013

Teresa Stanek Rea
*Acting Director of the United States Patent and Trademark Office*